Nov. 20, 1962
B. E. ILON
3,064,840
LOAD HANDLING DEVICE
Filed April 4, 1961
5 Sheets-Sheet 1
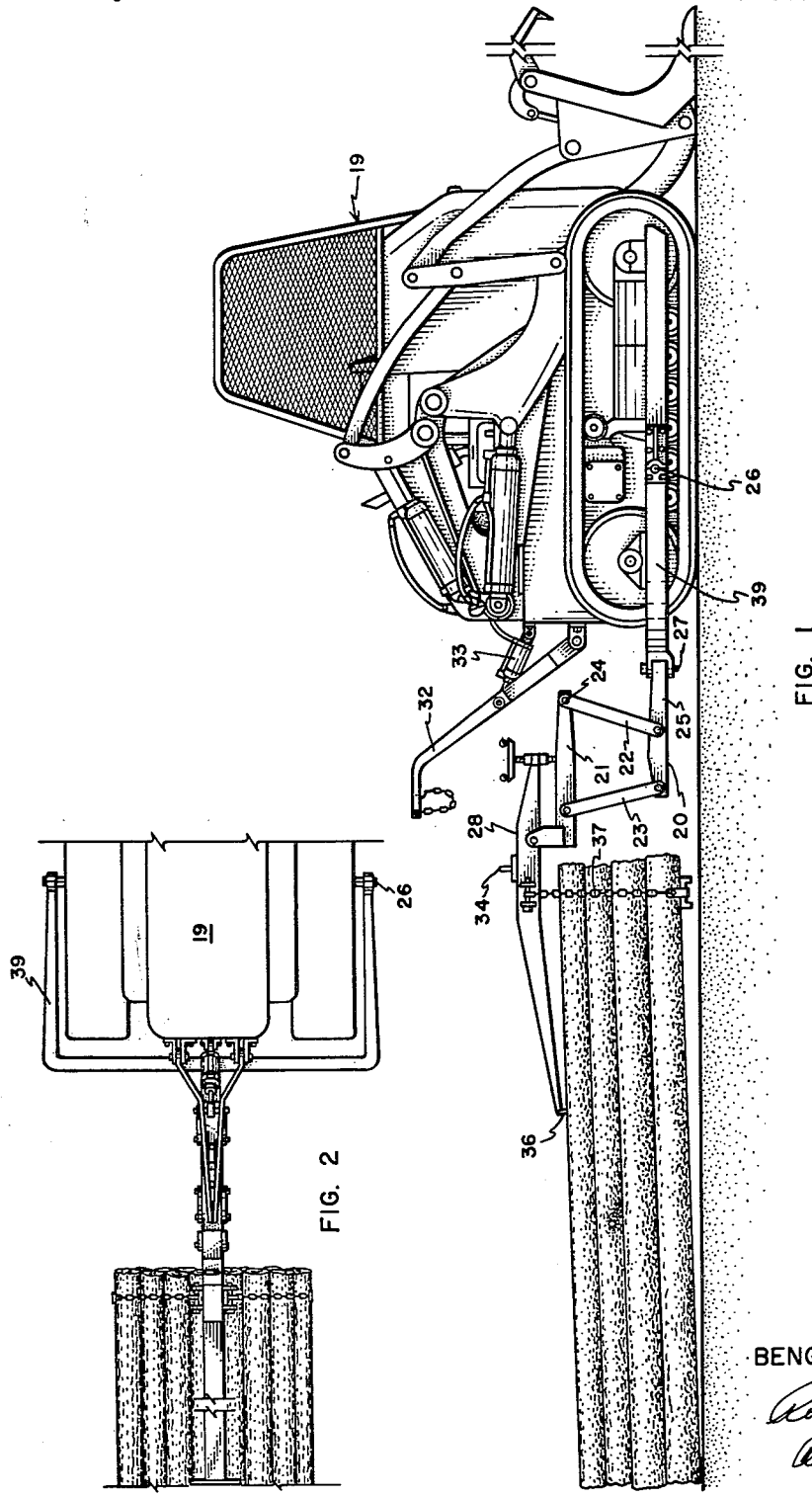
INVENTOR.
BENGT E. ILON Nov. 20, 1962

B. E. ILON 3,064,840

LOAD HANDLING DEVICE

Filed April 4, 1961

*INVENTOR.*
BENGT E. ILON
BY
Robert A. Finch
Attorney

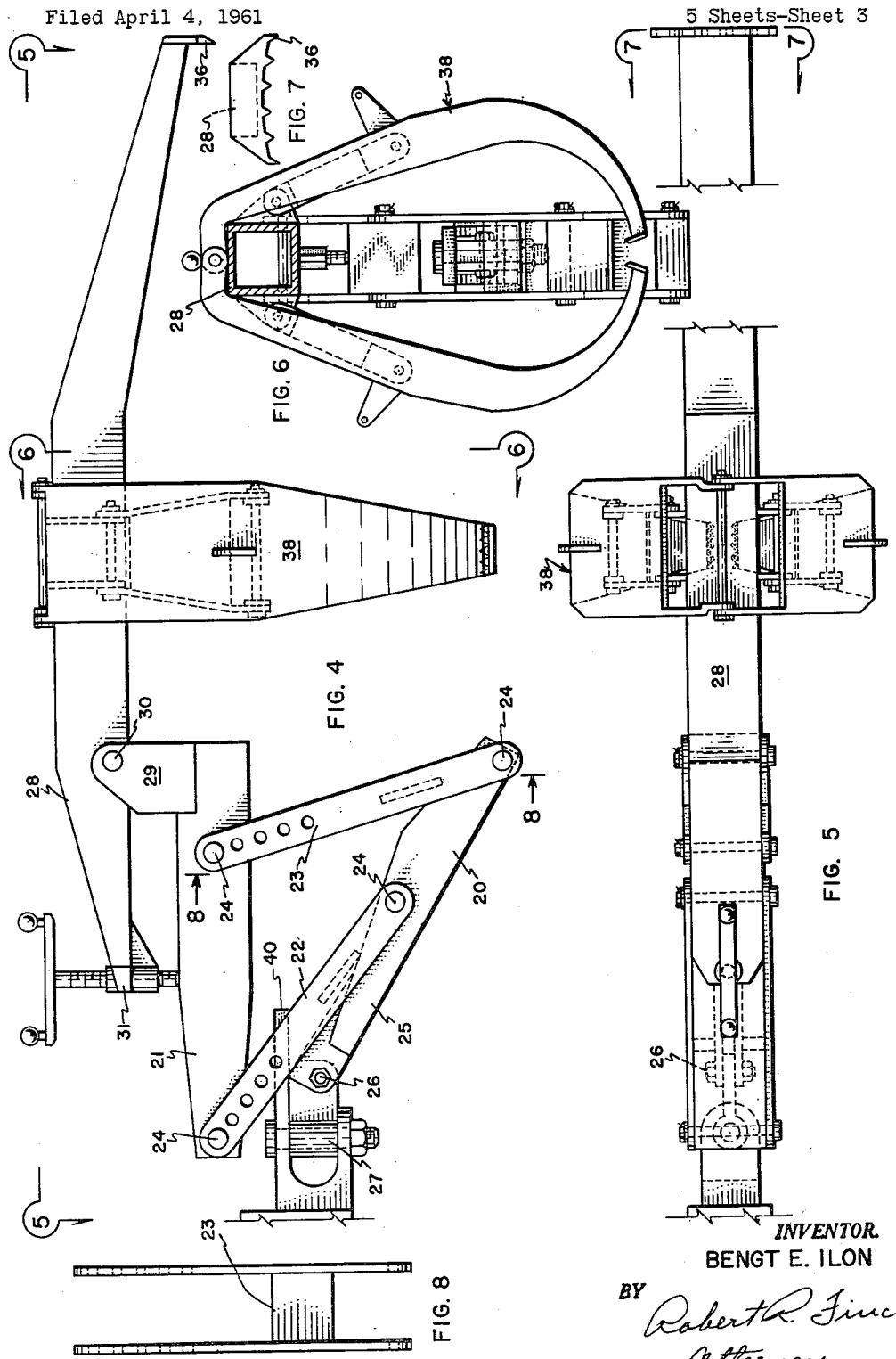

Nov. 20, 1962  B. E. ILON  3,064,840
LOAD HANDLING DEVICE
Filed April 4, 1961  5 Sheets-Sheet 5

*INVENTOR.*
BENGT E. ILON
BY Robert A. Finch
Attorney

United States Patent Office 3,064,840
Patented Nov. 20, 1962

3,064,840
LOAD HANDLING DEVICE
Bengt E. Ilon, Framnasbacken 6, Solna, Sweden
Filed Apr. 4, 1961, Ser. No. 100,710
7 Claims. (Cl. 214—350)

This invention relates generally to hauling units adapted to lift and tow loads engaged thereby.

A typical example of the use of such unit is in the logging industry where logs are towed from the woods to more convenient locations for further handling.

It is a primary object of the invention to provide a hauling unit of the type described in which a great portion of the ultimate load is applied as a downward force on the prime mover rather than being transmitted primarily as a lateral force.

It is a further object to provide a trailing unit adaptable to lift the front of the load being hauled automatically upon forward motion of the prime mover and without the application of any forces other than those generated by forward movement of the prime mover.

The foregoing and other objects will become more apparent from the following description which is to be taken in conjunction with the accompanying drawings, the description being offered by way of illustration only and not in limitation of the invention the scope of which is defined by the appended claims rather than by any preceding description.

In the drawings:

FIG. 1 is a side elevational view of an embodiment of the invention mounted on a log loading device.

FIG. 2 is a top partial plan view of the embodiment of FIG. 1.

FIG. 4 is an enlarged side elevational view of the embodiment illustrated in FIGS. 1 and 3.

FIG. 5 is a top elevational of the unit of FIG. 4 taken generally in the plane of lines 5—5 of FIG. 4.

FIG. 6 is a view taken generally in the plane of line 6—6 of FIG. 4.

FIG. 7 is a view taken in the plane of line 7—7 of FIG. 5.

FIG. 8 is a view taken as looking in the direction of arrows 8 in FIG. 4.

Figure 3:
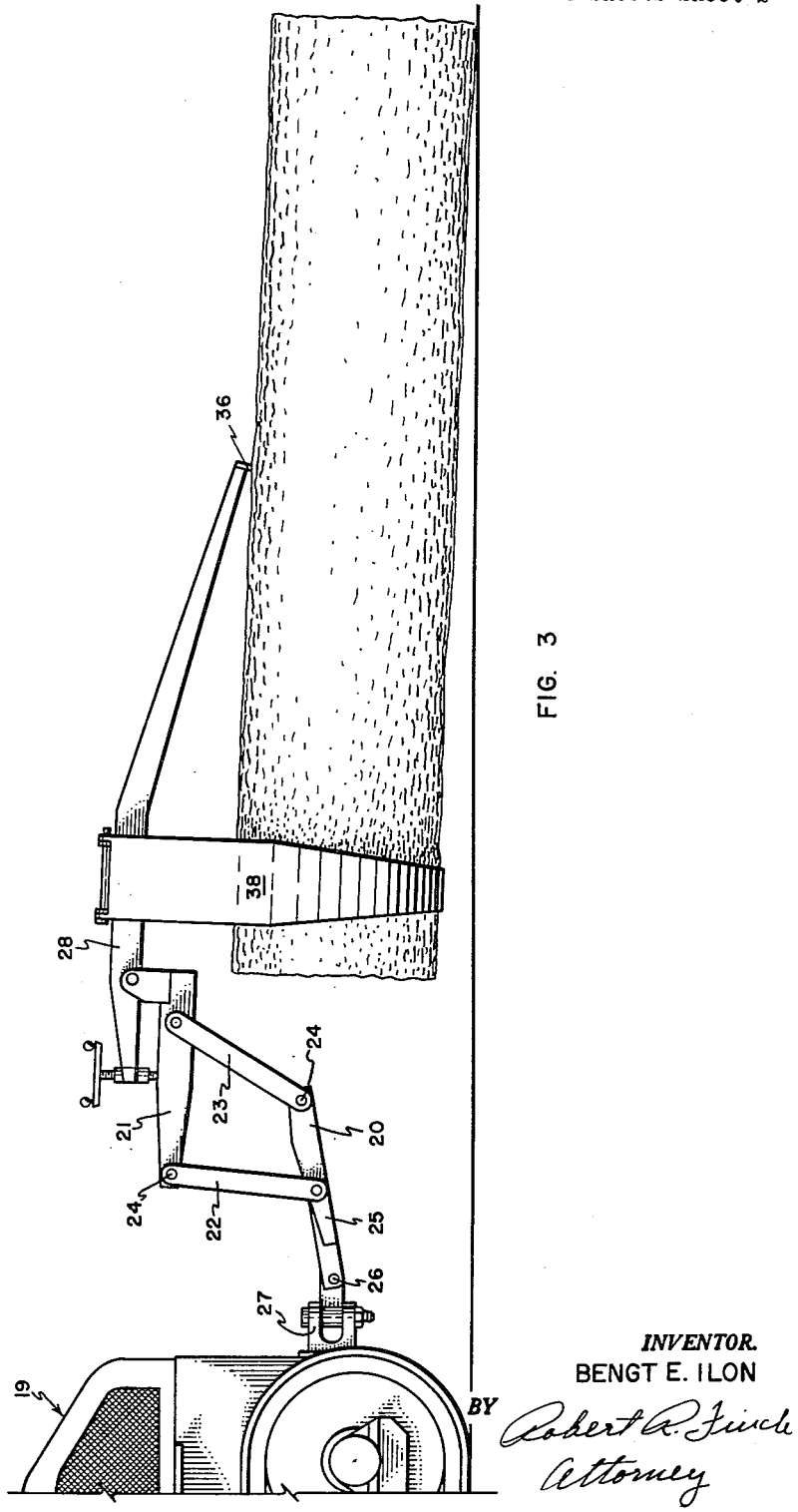
FIG. 3 is a side elevational view of another embodiment of the invention.

Referring now to FIGS. 1 through 8, like reference numerals will be utilized to describe similar elements.

In such drawings, the hauling unit is illustrated as attached on a track-type tractor 19 which is commonly used in logging operations.

Basically the unit comprises a collapsible quadrangle formed from four structural members including a base 20, a top 21 and spaced apart side members 22 and 23. The quadrangle thus formed is completely collapsible by virtue of all members being pivotally joined together at their points of connection 24.

The base member is provided with a rigid extension 25 which is pivotally connected to the prime mover as at a point 26 spaced from the quadrangle itself. This permits up and down movement of the base member and the entire quadrangle with respect to the prime mover 19.

In connection with vertical movement of the unit, it will be noted that the entire quadrangle moves in a substantially vertical plane and that all its elements are moveable in the same general plane. Horizontal movement of the entire unit with respect to the tractor may be provided for by a suitable pivot 27.

In order to provide proper engagement of the load, a fifth member 28 is provided and this member is mounted to form with the top 21 of the quadrangle a rigid extension that terminates on an opposite side of the quadrangle from the base extension 25. For ease of operation, the rearwardly extending boom 28 is pivotally mounted to the top of the quadrangle by means of a suitable bracket 29 and pivot 30.

An adjustable stop or block 31 is provided to engage the quadrangle top 21 at a point intermediate the points of juncture with the respective sides. This enables accommodation of a wider variety of loads by controllably limiting the pivotal movement required to bring the rear extension into rigid engagement with the quadrangle top 21.

Offsetting of the bracket 29 and pivot point 30 by which the rearward extension 27 is mounted to the quadrangle provides the advantages of a greater reach and greater lift upon operation of the device, all as will become more apparent as this specification proceeds.

When a load is on the device, as shown in FIGS. 1 and 3, a substantial portion of the pulling force is converted to a lifting component and the resulting downward reaction component acts directly on the tractor at the pivot 26 to thereby increase traction with the ground thereby increasing efficiency. The advantages are at least twofold: First, because a significant portion of the load is lifted free from the ground, the required force to pull the load is greatly reduced. Second, the increased traction makes pulling more efficient. Moreover, the overall effect is a reduced power demand for any given load because in addition to elimination of normal friction, the danger of plowing by the front of the load is completely avoided.

The only downward force applied to the tractor is at the pivot point 26 by which the unit is attached thereto. This is extremely important because it provides a down force at any selected point and thereby enables optimum distribution of the traction force. Additionally leverage action normally encountered when lifting a load on a rearwardly extending support is eliminated.

For purposes of storing the unit out of contact with the ground when it is inoperative, there may be provided a boom 32 (FIG. 1) which is moved up and down by a suitable unit such as hydraulic cylinder 33. The boom is provided with a chain or other hook for connection to a bracket 34 on the boom 28.

The load to be hauled is engaged at two points. The first point is at the rear terminal end of the boom 28 which is provided with teeth 36 for gripping the top of the load. The second engagement point is at the location selected to effect lifting of the load and which is accomplished by means of a chain such as 37 (FIGS. 1–2) or tongs 38 (FIGS. 3–7).

In FIG. 3 it will be noted that the unit is mounted to a regular draw bar on the tractor. This puts the down force close to the wheel axles and can be modified so that the down force or pivot point is directly over the axle.

In FIGS. 1 and 2 there is illustrated an embodiment where the rigid unit is connected to a U frame 39 that is in turn connected to the tractor at pivot points 26 located between the front and rear axles.

Figure 9:
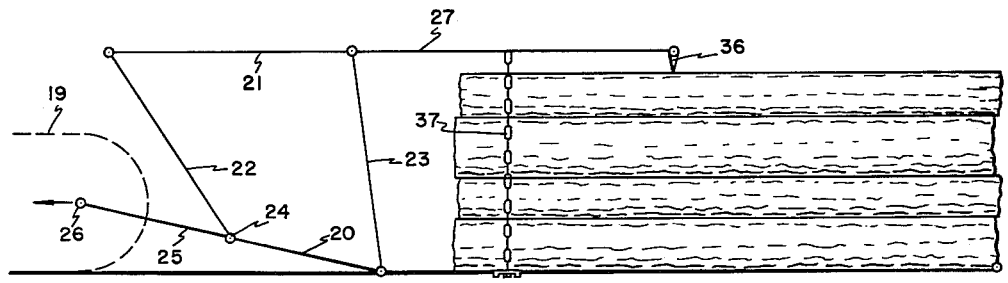
FIGS. 9 and 10 are diagrammatic views illustrating operation of the device when starting from a position in rest on the ground.
Figure 10:
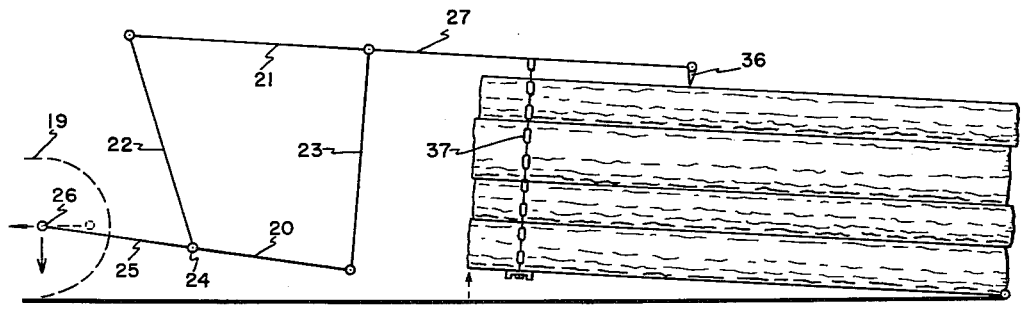

Reference is now made to FIGS. 9 and 10 illustrating operation starting from a position of rest on the ground.

In FIG. 9 the unit is shown partially collapsed and downwardly pivoted to rest on the ground. At this point the unit is brought into contact with a load by means of the rear hooks 36 of boom 28 engaging the top of the load, the chain 37 embracing the load to lift a forward portion from beneath. As the tractor moves forward, as indicated by the change in position of pivot 26 from FIG. 9 to 10, the base 20 exerts a pulling movement but, because the load resists forward motion, the effect is to pull or swing legs 22 and 23 toward the upright position. This swinging places rod 22 under compression and tends to raise the upper member 21 and boom 28. This imparts a lifting force on chain 37 to raise the front end of the load. The lifting will continue until the forward pull of the tractor exerted through the base 20 and leg 23 exceeds the frictional resistance of the load.

Figure 11:
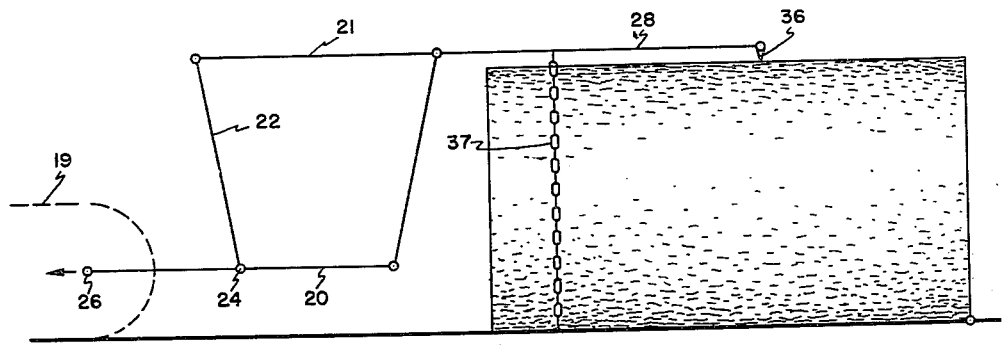
FIGS. 11, 12 and 13 are diagrammatic views, similar to those of FIGS. 9 and 10, but illustrating motion of the device when starting from a different position.
Figure 12:
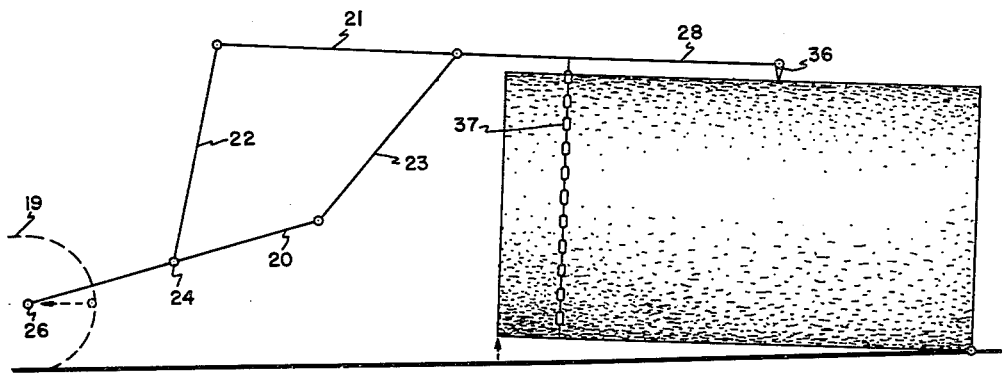
Figure 13:
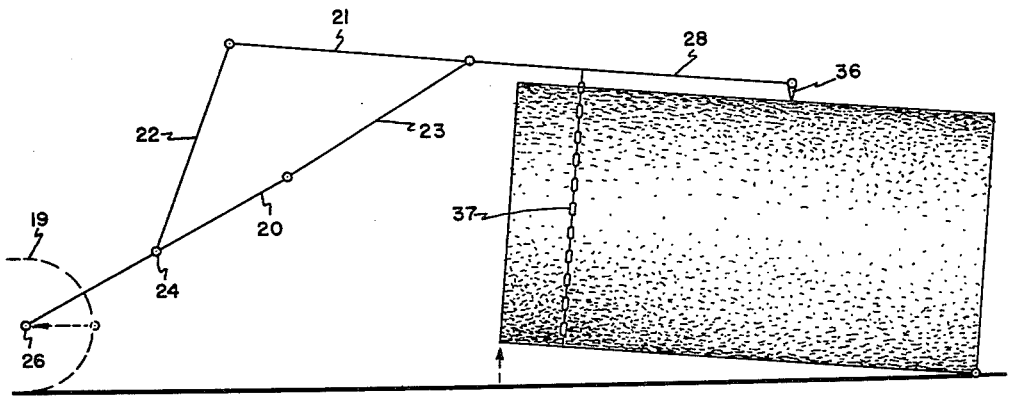

FIGS. 11–13 illustrate further the mechanics involved.

In FIG. 11 the base 20 and its rigid extension 25 are shown as being substantially parallel to the ground and to the top 21 and its extension 28. The load engaging hook 36 is in position on top of a load to be lifted and the chain 37 is placed around the load. As the tractor moves forward, indicated by change of position of pivot point 26, the base 20 and side 23 are again placed under tension, but the pulling movement imparted thereby places the other side member 22 under compression to thereby lift the top 21 and the boom extension 28 with the result that chain 37 lifts the load upwardly. Again, depending on the frictional resistance of the load to forward motion, lifting increases, as indicated in FIG. 13, until there is a straight line between the base 20 and side 23. In practice, this extreme position would probably never be reached since the friction between the load and the ground would have been previously overcome and the load would be trailed along.

In the illustrated embodiment, the collapsible quadrangle is shown in the form of a structure in which the base is shorter than the top yet the sides are substantially equal in length. This is not absolutely required and it would be possible to use a variety of shapes including a parallelogram. However the structure shown possesses the advantage of a rapid initial rise and also a relatively long lever arm action by means of the longer top member 21 which in effect pivots about the juncture between it and the rear side member 23.

It is important that the pivot point where the unit is mounted to the tractor be offset, as by the length of the extension 25, from the corner pivot of the quadrangle itself. Without this, lifting due to compression of leg 22 could not occur after the quadrangle had reached a point where the side closest the tractor is substantially vertical.

As noted, lifting of the load is effected by compression of front side 22 which exerts an upward force on the forward end of the top 21. Since the rear terminus of boom 28 resists downward movement, it follows that the further forward the load lifting support (chain 37) is placed, the greater will be the distance of vertical lift per unit of forward travel. Thus, within practical limits, the requirement for positioning of the actual load engaging lifters (chain 37 or tongs 38) is only that it be forward of the fixed rear pivot of the boom (teeth 36). Also, greater lift per unit of forward travel will occur as the point of rigid contact between the boom and the quadrangle moves forward; and it is within the scope of the invention to provide a forward extension on the top 21 so that such contact will be forward of the quadrangle.

Obviously, the quadrangle may be made up as a three dimensional structure comprising two quadrangles spaced apart but in parallel planes. This would give added strength. Also, if such a structure were made without lower cross connectors, it could actually straddle a load if desired and the load lifting could be done by the top of the quadrangle.

It should be noted that the gripping teeth 36, while not, per se, an essential part of the invention, do perform a desirable function in holding the boom 28 against forward movement while the lifting function is performed. Obviously other arrangements can be employed. Also, the boom could be made to engage the load at a lower point or, by a suitable structure, the rear of the boom could rest on the ground on skids or the like whereby the boom and chain would be used for lifting. In other words, the important functions to be performed are those of limiting both downward and forward movement of the boom so the lifting can be effected upon forward movement of the tractor.

In the structure illustrated in FIGS. 2–8, the pivot 26 is mounted aft of the rear axle of the tractor. This arrangement would normally act to raise the front of the tractor by lever action. However, this tendency can be overcome and, indeed, reversed by the use of a stop member 40 (FIG. 4) limiting upward pivoting of the bottom 20 whereby such upward movement results in a lever action tending to raise the rear and depress the front of the tractor.

Although the tongs 38 are illustrated as fixedly mounted to the boom, they may be pivotally mounted for fore and aft swinging movement in a manner similar to the chain 37.

Further in connection with the boom, it will be noted that in the embodiment illustrated in FIGS. 1–8, a configuration is employed whereby the boom bends downwardly. This is of advantage in that it enables contact with the load sooner than if a straight boom were employed, thus requires less travel about the pivot.

I claim:

1. A hauling unit for use in a trailing position behind a prime mover, said unit comprising a quadrangle formed from elongated top and bottom members joined by spaced-apart sides pivotally connected thereto to enable collapsing movement of said quadrangle in a substantially vertical plane, a forward extension on said bottom member formed to be rigid therewith and terminating outside said quadrangle, means adjacent the terminal end of said forward extension enabling its pivotal connection to a prime mover for free vertical movement of said extension and quadrangle with respect to the prime mover; and load lifting means associated with said quadrangle, comprising a rearward extension of said top member having a terminal end outside of said quadrangle adapted to bear downwardly with respect to a load to be lifted, and load gripping means on said rearward extension at a location forward of its said terminal end.

2. A construction according to preceding claim 1 in which the forward portion of said rearward extension of said top member overlaps said top member and is pivotally mounted for rocking movement with respect thereto said pivotal mounting being at a location forward of said load gripping means of said rearward extension.

3. A construction according to preceding claim 1 in which said forward extension of said bottom member includes a U frame the free ends of which collectively form said terminal end of said forward extension.

4. A construction according to preceding claim 1 with the addition of means adjacent said terminal end of said forward extension enabling horizontal movement of said extension and quadrangle independently of said means enabling vertical movement with respect to a prime mover.

5. A hauling and trail assembly comprising a prime mover, a rearwardly extending first elongated member pivotally mounted adjacent one end to said prime mover for at least vertical movement with respect thereto, second and third elongated members pivotally mounted adjacent their lower ends to said base member at spaced points thereon for swinging movement toward and away from said prime mover in a substantially vertical plane, a fourth elongated member, means pivotally connecting the upper ends of said second and third members to spaced apart points on said fourth member whereby said first, second, third and fourth members form a collapsible quadrangle with said first and fourth members forming respectively the top and bottom and the second and third members the sides of said quadrangle, a fifth elongated member pivotally mounted intermediate its ends on said fourth member for rocking movement in a plane common to that in which said quadrangle collapses, said fifth member terminating at one end on the opposite side of said quadrangle from said prime mover and extending in the opposite direction at least to an intermediate location between the pivotal connections of said second and third members to said fourth member whereby said fifth member is pivotable into and out of contact with said fourth member at said intermediate location, adjustable block means operable between said fourth and fifth members at said intermediate location, and load carrying means on said fifth member between its said one end terminus and its point of pivotal connection to said fourth member.

6. A construction according to preceding claim 1 in which the length of said top member of said quadrangle is greater than the length of said bottom member thereof.

7. A construction according to claim 1 in which the rear portion of said rearward extension of said top member bends downwardly toward said bottom member.

References Cited in the file of this patent

UNITED STATES PATENTS

| | | |
|---|---|---|
| 1,861,556 | Smith et al. | June 7, 1932 |
| 1,870,906 | Gottschalk et al. | Aug. 9, 1932 |
| 2,394,217 | Tom | Feb. 5, 1946 |
| 2,703,180 | Brown | Mar. 1, 1955 |